United States Patent [19]

Nagano

[11] Patent Number: 5,570,339
[45] Date of Patent: Oct. 29, 1996

[54] OPTICAL DISC AND A RECORDING AND/OR REPRODUCING APPARATUS HAVING COPY-PROTECTION FUNCTION

[75] Inventor: Hirofumi Nagano, Yokohama, Japan

[73] Assignee: Victor Company of Japan, Ltd., Yokohama, Japan

[21] Appl. No.: 278,422

[22] Filed: Jul. 21, 1994

[30] Foreign Application Priority Data

Jul. 22, 1993 [JP] Japan ................................. 5-201738

[51] Int. Cl.$^6$ ........................................................ G11B 7/00
[52] U.S. Cl. ......................... 369/275.3; 369/275.4; 360/60
[58] Field of Search ........................... 369/54, 58, 48, 369/47, 59, 32, 275.3, 275.4; 360/60; 380/3, 4, 5

[56] References Cited

U.S. PATENT DOCUMENTS

| | | | |
|---|---|---|---|
| 4,716,560 | 12/1987 | Itonaga | 369/275.1 |
| 4,879,704 | 11/1989 | Takagi et al. | 369/59 |

FOREIGN PATENT DOCUMENTS 0545472  6/1993  European Pat. Off. .

OTHER PUBLICATIONS

JAS Journal, Jan. 1993 "MD Format", K. Fujiie.

*Primary Examiner*—Nabil Z. Hindi
*Attorney, Agent, or Firm*—Michael N. Meller

[57] ABSTRACT

A copy protected optical disc is recorded with digital data and a key information forming track turns of a predetermined pitch, in which the digital data are converted to a string of signal waveforms in a predetermined encoding scheme defined by the key information, the key information is recorded in a form of single frequency or FM carrier signal modulating the string of signal waveforms carrying the digital data in such a pit configuration that a width of the series of pits in a radial direction of the optical disc is deviated symmetrically with respect to a center of each track turn having a maximum width smaller than the predetermined pitch. And a recording apparatus for the disc comprises a converting device converting the digital data into a string of signal waveforms in a predetermined encoding scheme defined by the key information, a carrier generating device generating a carrier signal related to the key information, and a modulating device modulating a light beam with the digital data together with the carrier signal and record the data and the carrier signal as a series of pits on the disc, whereas a reproducing apparatus for the disc comprises detecting device detecting the recording codes and the key information recorded on the disc decoding device decoding digital data from the recording codes using the key information.

2 Claims, 7 Drawing Sheets

OPTICAL DISC AND A RECORDING AND/OR REPRODUCING APPARATUS HAVING COPY-PROTECTION FUNCTION

BACKGROUND OF THE INVENTION

1. Field of the Invention

The present invention relates to an optical disc and a recording and reproducing apparatus, particularly, relates to an optical disc and a recording and/or reproducing apparatus for the optical disc having a copy-protection function.

2. Description of the Related Art

A description is given of the prior arts referring to the accompanying drawings.

FIG. 1 is a fragmental plan view showing a plurality of information pit rows formed on an optical disc in the prior art;

FIG. 2 represents a relation between an information pit width and a light intensity distribution of a laser beam in the prior art;

FIG. 3 is a block diagram showing a flow of recording signal in the recording device in the prior art; and FIG. 4 is a block diagram showing a flow of reproduction signal in the reproducing device in the prior art.

In FIG. 1, a reference character 11 designates a first information pit row, 12 a second information pit row, 13 a third information pit row, 11A a first information pit, 11B a second information pit, 11C a third information pit, $L_{11A}$ a first information pit length, $L_{11B}$ a second information pit length, $L_{11C}$ a third information pit length, $P_{11AB}$ an interval between the first information pit 11A and the second information bit 11B, $P_{11BC}$ an interval between the second information pit 11B and the third information pit 11C, "$W_K$" a width of each of the information pits 11A, 11B, 11C, "q" a pitch between neighboring information pit rows.

In FIG. 2, a reference character 14 designates a recording master disc, 15 a photo-resist, $16_K$ the information pit, and $17_K$ a light intensity distribution curve of a laser beam.

In FIG. 3, a reference character 50 designates a recording device, 51 an encoder, 52 a photomodulator, and 52a a laser beam carrying a series of recording codes.

In FIG. 4, a reference character 55 designates a reproducing device, 56 a CD (Compact Disc), 57 an optical pickup, 58 a RF amplifier, and 59 a decoder.

Next, a description is given of an outline of an optical disc apparatus for the CD recorded with music as an example.

First of all, an outline of a recording by using the recording device 50 for the CD, i.e., an outline of a master disc cutting, is described as follows:

As shown in FIG. 3, sound signals are converted into a predetermined digital data by an A/D converter (not shown) and the digital data are inputted to the encoder 51. These digital data are converted into a waveform string on the basis of predetermined conversion rules by the encoder 51. This waveform string is inputted to the photomodulator 52. This waveform string is amplified by the photomodulator 52, and is converted into a series of recording codes for driving a laser generator (not shown). The laser generator generates a laser beam 52a carrying a series of recording codes as an intensity modulated light beam in response to the series of recording codes. The photo-resist 15 coated on the recording master disc 14 is exposed to the laser beam 52a carrying the series of recording codes, so that exposed portions to become information pits are formed in accordance with the series of recording codes. Thus, an information pit pattern is formed on the photo-resist 15 by causing the photo-resist 15 to be developed. From the recording master disc 14 provided with the photo-resist 15 having the information pit pattern, a stamper (not shown) is formed through predetermined processes. A replica of the information pit pattern formed on the photo-resist 15 is transferred to a polycarbonate substrate by injection-molding of polycarbonate resin, using the stamper as a metal mold. Thus, the CD 56 is obtained by performing a predetermined process on the polycarbonate substrate.

Next, a description is given of a shape of the information pit.

In FIG. 1, there are shown the first, second and third information pit rows 11, 12, 13 on the CD 56 as examples of the information pit rows. The information pit rows 11, 12, 13 are disposed along a single spiral track having a pitch between the information pit rows being is made a fixed value of "q".

A width of each of the information pits 11A, 11B, 11C . . . of which the information pit rows 11, 12 and 13 are composed, has a fixed value "$W_k$", but lengths $L_{11A}$, $L_B$ $L_{11C}$ . . . thereof and intervals $P_{11AB}$, $P_{11BC}$, thereof are subject to change corresponding to the series of the recording codes.

The width "$W_k$" of each of the information pits $11_A$, $11_B$ and $11_C$... is determined by a light intensity distribution $17_k$ of a laser beam used to irradiate the photo-resist 15 on the recording master 14. Specifically, in FIG. 2, the laser beam 52a has the light intensity distribution $17_k$, wherein the ordinate represents an intensity of the laser beam (spot) and the abscissa represents a radial position of the recording master disc 14 or the CD 56. When a width of the laser beam having a light intensity more than a threshold value for exposing the photo-resist 15 is "$W_k$", a domain of the photo-resist irradiated with the laser beam having the light intensity more than the threshold value is turned into an exposed portion having a width of "$W_K$". The exposed portion is soluble in a development solution due to a photo-chemical reaction, so that it becomes a pit $16_k$ caused by a predetermined development process. Thus, the information pit rows are formed corresponding to the series of recording codes.

On the other hand, the lengths $L_{11A}$, $L_{11B}$, $L_{11C}$ ... of the information pits and the intervals $P_{11AB}$, $P_{11BC}$, ... therebetween are determined by a high intensity duration and a low intensity duration (OFF when a threshold control is provided) of the laser beam, respectively.

Next, a description is given of an outline of the reproducing apparatus 55.

As shown in FIG. 4, the information pit rows on the CD 56 are constantly irradiated with the laser beam by a laser element which is one of components of the optical pickup 57. As a result, the irradiated laser beam is reflected from a surface of the CD 56 as an intensity modulated beam of light responsive to positions and shapes of the information pits. Reproduction signals are obtained by the optical pickup 57 which detects thus modulated reflected beam of light.

The reproduction signals are inputted to the RF amplifier 58. After amplified thereby, the reproduction signals are outputted as a waveform string and are inputted to the decoder 59 after having subjected to a wave equalization and to a discriminating process (not shown).

From the decoder 59, a series of data are obtained by an inverse conversion of the series of codes recorded on the CD 56, and the series of data are converted into sound signals by a D/A converter (not shown).

When music information such as above and picture or character information is in a form of digital information, quality of the information is not degraded upon copying or transferring the information because of an inherent characteristic of the digital information transmission, compared with analogue form thereof, this causes a problem of infringement of copyright. Thus, it is required to inhibit or to limit a perfect copy of the digital information as it is (referred to as a digital copy hereafter). For example, there is proposed a countermeasure referred to as the Serial Copy Management System (SCMS) adopted to the Mini Disc (MD) against the digital copy.

In the SCMS, a protect code (or a key code) for copy permission or copy inhibition is included in a part of digital information recorded on the MD, and when the digital copy is performed of the MD, the copying the MD beyond one generation is intended to be inhibited by causing an MD apparatus to refer the protect cord.

Specifically, the protect code is written within an area of a table of contents (referred to as TOC). If a code of "non-protect" is written in the TOC of the MD, the MD is able to be copied. When the MD has been copied onto a first generation copy, a code of "protect" is written in its area of TOG. If the code of "protect" is written therein, the MD is unable to be copied to produce a second generation copy. Thus, the MD is prevented from being copied in two or more generations.

In the above SCMS, the protect code is written in the part of the information recorded in the MD, and the copy permission or the copy inhibition of the MD is determined by the MD apparatus referring to the protect code written in the TOC. Thus, in a case where the information recorded on the MD is directly read out as it is without decoding and the information read out is written in another disc as it is, the information including the protect code can be copied as it is regardless of the contents of the protect code. This enables the MD to be copied through many generations, thus, the illegal copying can not be prevented by the SCMS.

SUMMARY OF THE INVENTION

Accordingly, a general object of the present invention is to provide a novel and useful optical disc and a recording and/or reproducing apparatus having copy-protection function in which the above disadvantage has been elimanated.

A more specific object of the present invention is to provide an optical disc and an information recording and reproducing apparatus capable of preventing the illegal copying of the optical disc by causing the protect code impossible to be read out as it is when the information recorded on the optical disc is read out in a conventional manner by the conventional reproducing apparatus.

Another specific object of the present invention is to provide a copy protected optical disc optically recorded with digital data and a key information as a series of pits forming track turns of a predetermined pitch on the optical disc, the digital data being converted to a string of signal waveforms according to a predetermined encoding scheme defined by the key information, the key information being a form of carrier signal modulating the string of signal waveforms carrying the digital data in such a pit configuration that a width of the series of pits in a radial direction of the optical disc is deviated symmetrically with respect to a center of each track turn having a maximum width smaller than the predetermined pitch.

Another specific object of the present invention is to provide a copy protected optical disc recording apparatus comprising, means for receiving digital data and a key information, means for converting the digital data into a string of signal waveforms according to a predetermined encoding scheme defined by the key information, means for generating a carrier signal having a predetermined relationship with the key information, and means for modulating a light beam with the string of signal waveforms carrying the digital data together with the carrier signal producing a series of recording codes, wherein both envelopes of the series of recording codes are modulated by the carrier signal, and for optically recording the series of recording codes thus modulated as a series of pits on an disc to be copy protected.

Another specific object of the present invention is to provide a copy protected optical disc reproducing apparatus comprising, first detecting means for optically detecting and reproducing a series of recording codes recorded as a series of pits on a copy protected optical disc, and a carrier signal carrying a key information and modulating both envelopes of the series of recording codes, second detecting means for detecting the key information from the carrier signal, and decoding means for decoding digital data contained in the series of recording codes in a string form of signal waveforms by using the key information detected by the second detecting means.

Another specific object of the present invention is to provide a copy protected optical disc recording and recording apparatus comprising, means for receiving digital data and a key information, means for converting the digital data into a string of signal waveforms according to a predetermined encoding scheme defined by the key information, means for generating a carrier signal having a predetermined relationship with the key information, means for modulating a light beam with the string of signal waveforms carrying the digital data together with the carrier signal producing a series of recording codes, wherein both envelopes of the series of recording codes are modulated by the carrier signal, and for optically recording the series of recording codes thus modulated as a series of pits on an disc to be copy protected, first detecting means for optically detecting and reproducing a series of recording codes recorded as the series of pits on the copy protected optical disc, and a carrier signal carrying the key information and modulating both envelopes of the series of recording codes, second detecting means for detecting the key information from the carrier signal, and decoding means for decoding digital data contained in the series of recording codes in a string form of signal waveforms by using the key information detected by the second detecting means.

DETAILED DESCRIPTION OF THE PREFERRED EMBODIMENTS

A description is given of an embodiment of the present invention referring to accompanying drawings.
(A first Embodiment of the present invention)

Figure 1:
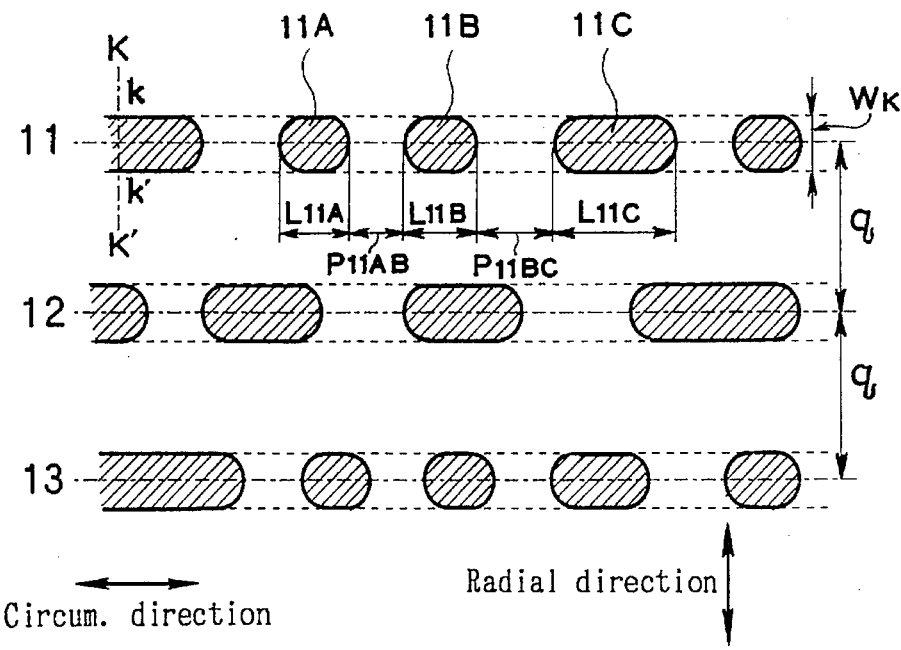
FIG. 1 is a fragmental plan view showing a plurality of information pit rows formed on an optical disc in the prior art.
Figure 2:
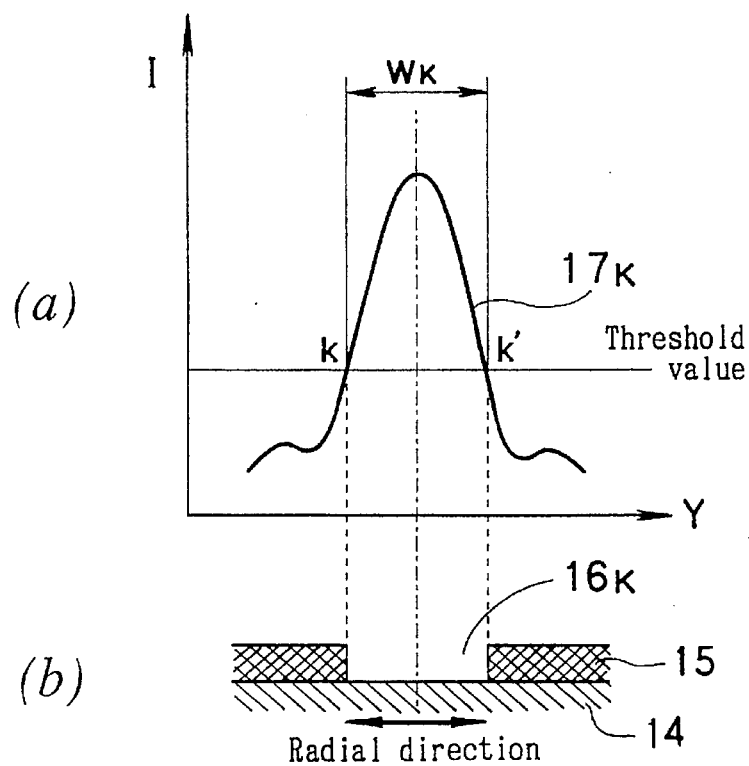
FIG. 2 represents a relation between an information pit width and a light intensity distribution of a laser beam in the prior art.
Figure 3:
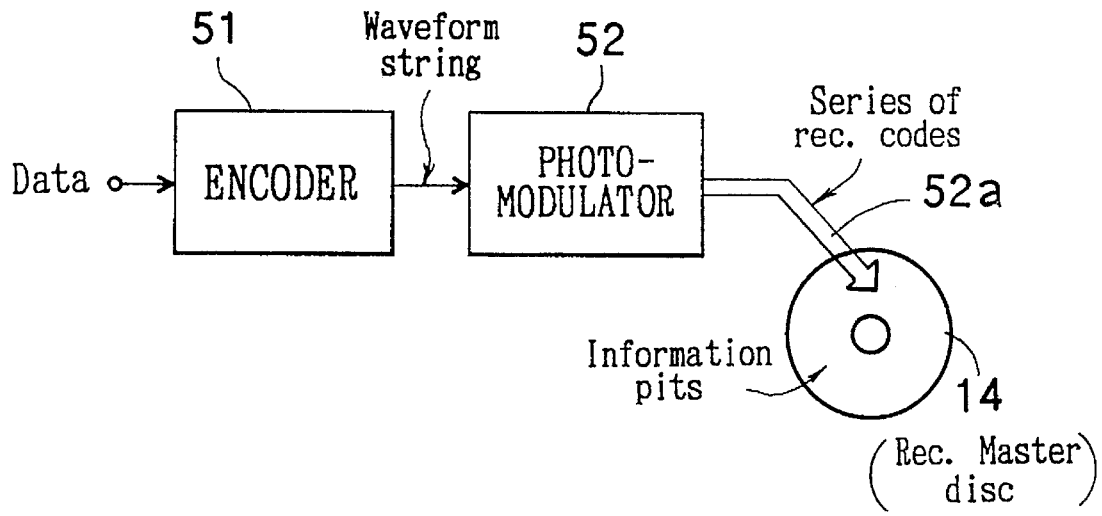
FIG. 3 is a block diagram showing a flow of recording signal in the recording device in the prior art.
Figure 4:
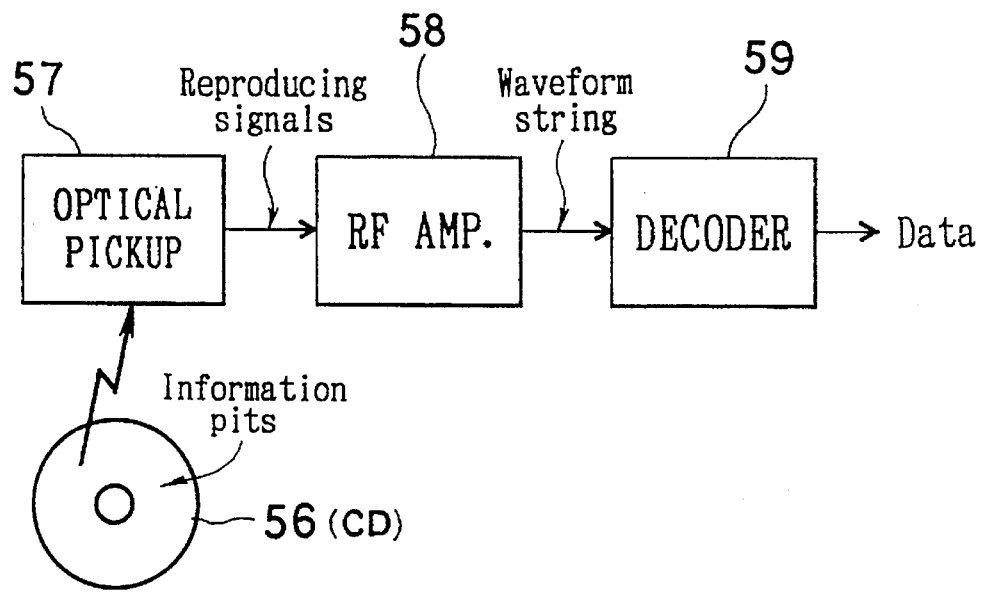
FIG. 4 is a block diagram showing a flow of reproduction signal in the reproducing device in the prior art.
Figure 5:
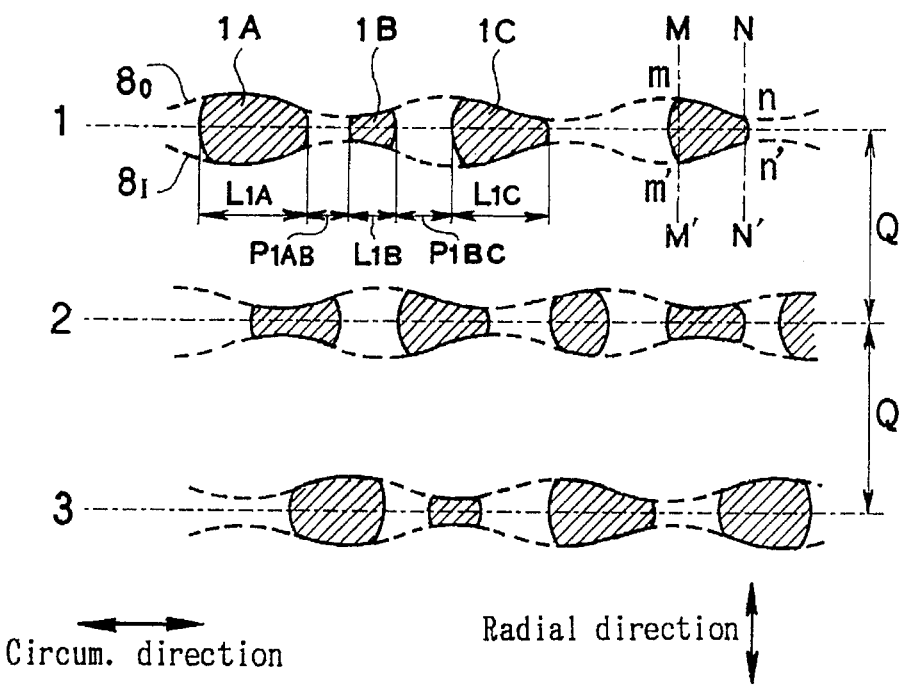
FIG. 5 is a fragmental plan view showing a plurality of information pit rows formed on the optical disc of a first embodiment of the present invention.
Figure 6:
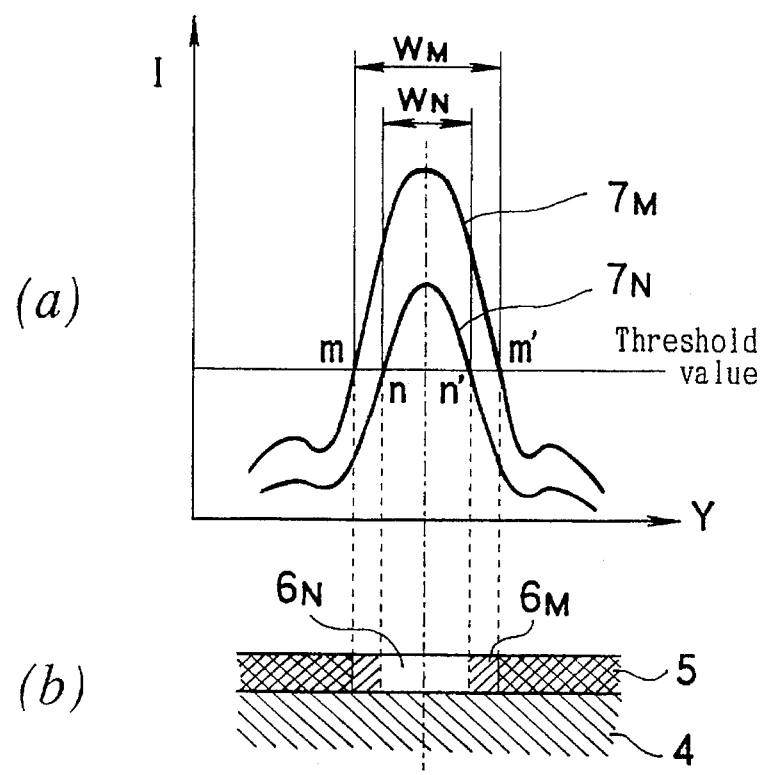
FIG. 6 represents a relation between a width of the information pit on the optical disc of the first embodiment and a light intensity distribution of a laser beam for recording, wherein (a) shows light intensities of the laser beam and (b) shows pit cross sections along line M–M' and line N–N' of FIG. 5.
Figure 7:
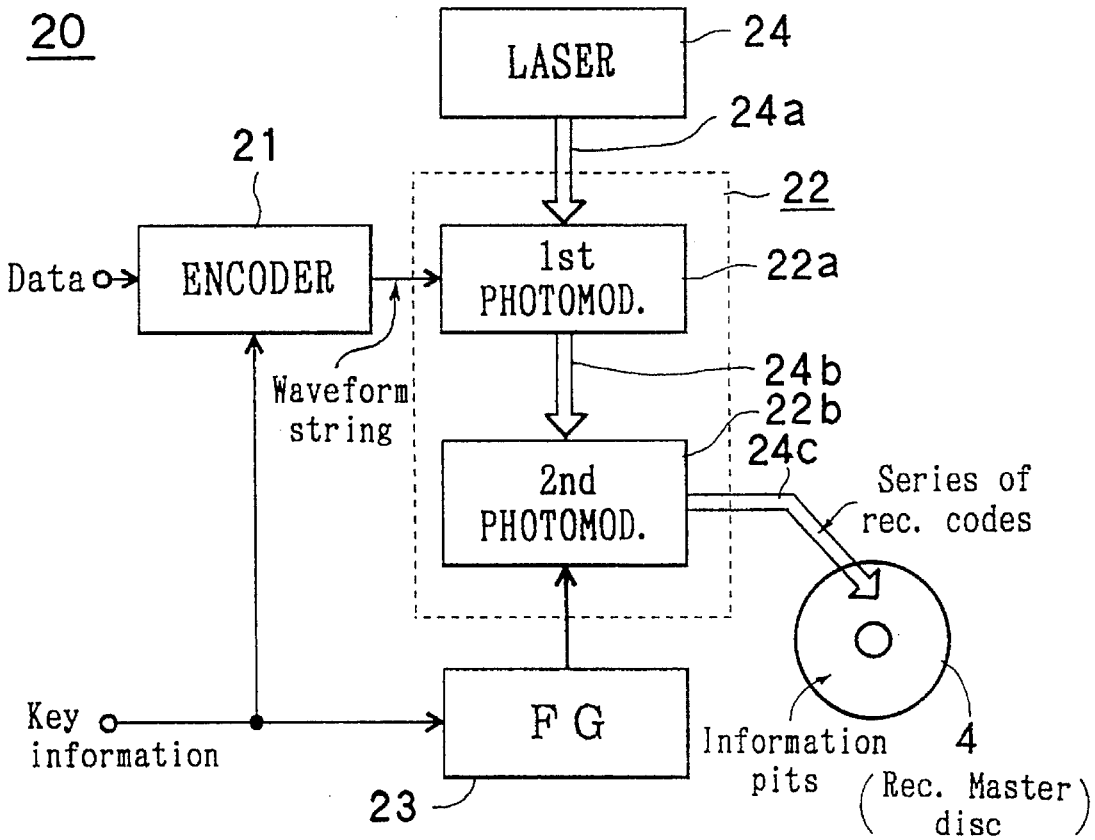
FIG. 7 is a block diagram showing flow of recording signals in a recording device of the first embodiment in the present invention.
Figure 8:
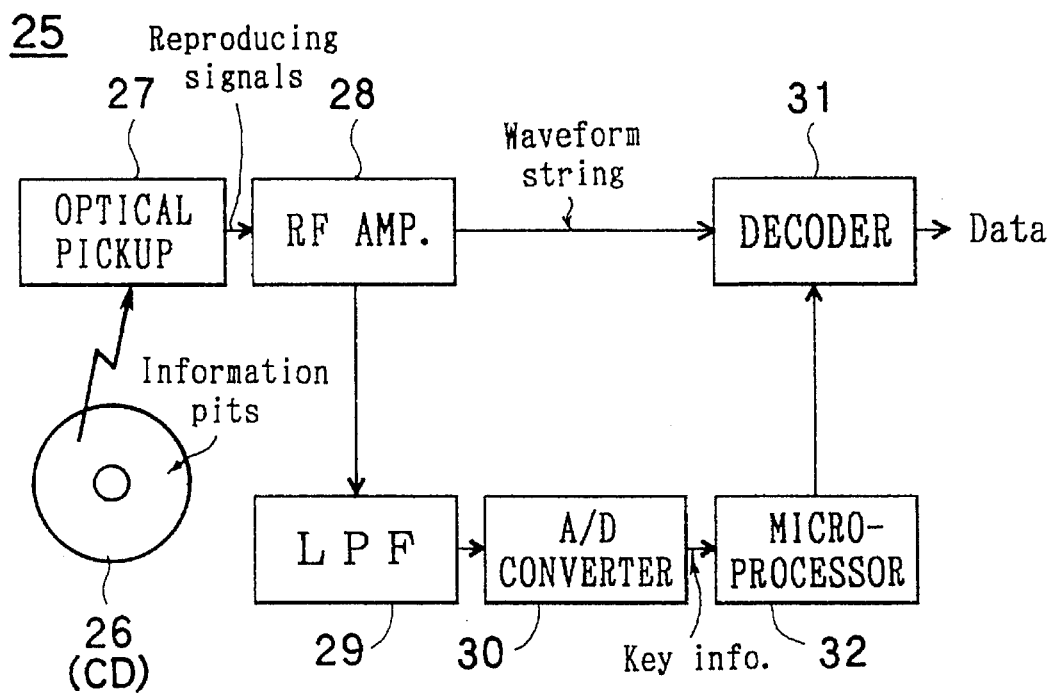
FIG. 8 is a block diagram showing flows of reproduction signals in a reproducing device of the first embodiment in the present invention.
Figure 9:
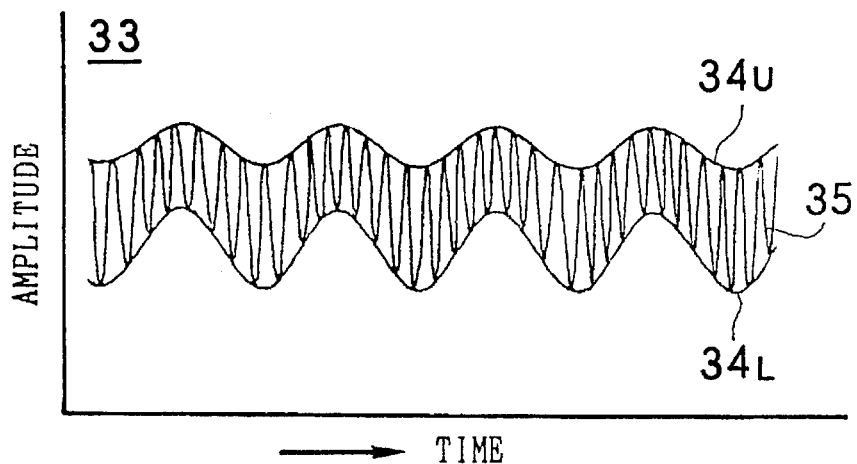
FIG. 9 shows a reproduction signal (a series of recording codes) in the information reproducing apparatus of the first embodiment in the present invention.
Figure 10:
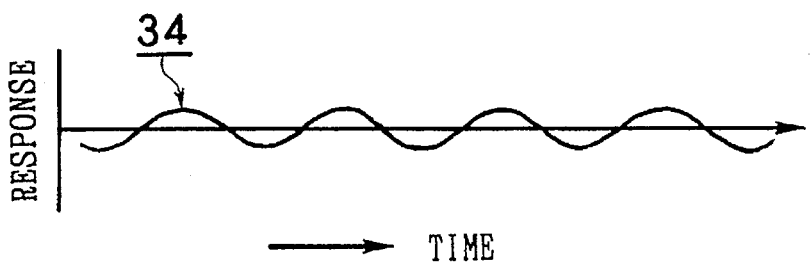
FIG. 10 shows a detected signal having passed an LPF in the information reproducing apparatus of the first embodiment in the present invention.

FIG. 5 is a fragmental plan view showing a plurality of information pit rows formed on an optical disc of a first embodiment of the present invention;

FIG. 6 represents a relation between a width of the information pit on the optical disc of the first embodiment and a light intensity distribution of a laser beam for recording, wherein (a) shows light intensities of the laser beam and (b) shows pit cross sections along line M–M' and line N–N' of FIG. 5;

FIG. 7 is a block diagram showing flows of recording signals in a recording device of the first embodiment in the present invention;

FIG. 8 is a block diagram showing flows of reproducing signals in a reproducing device of the first embodiment in the present invention;

FIG. 9 shows a reproduction signal (a series of recording codes) in the information reproducing apparatus of the first embodiment in the present invention; and FIG. 10 shows a detected signal having passed an LPF in the information reproducing apparatus of the first embodiment in the present invention.

In FIG. 5, a reference character 1 designates a first information pit row, 2 a second information pit row, 3 a third information pit row, 1A a first information pit, 1B a second information pit, 1C a third information pit, $L_{1A}$ a first information pit length, $L_{1B}$ a second information pit length, $L_{1C}$ a third information pit length, $P_{1AB}$ an interval between the first information pit 1A and the second information pit 1B, $P_{1BC}$ an interval between the second information pit 1B and the third information pit 1C, "Q" a pitch between neighboring pit rows, $8_o$ an outer contour of the pit rows, and $8_I$ an inner contour of the same with respect to a center of disc.

In FIG. 6, a reference character 4 designates a recording master disc, 5 photo-resist, "$W_M$" a pit width along M–M' cross section, "$W_N$" a pit width along N–N' cross section, $6_M$ a pit portion having a M–M' cross section, $6_N$ a pit portion at the N–N' cross section, $7_M$ a light intensity distribution curve of a laser beam for forming the pit portion $6_M$ at the M–M' cross-section, $7_N$ a light intensity distribution curve of a laser beam for forming the pit portion $6_N$ having N–N' cross-section.

In FIG. 7, a reference character 20 designates a recording device, 21 an encoder, 22 a photomodulator, 22a a first photomodulator, 22b a second photomodulator, 23 a frequency generator (FG), 24 a laser, 24a a laser beam oscillator, 24b a laser beam carrying a waveform string, and 24c a laser beam carrying a series of recording codes.

In FIG. 8, a reference character 25 designates a reproducing device, 26 a CD, 27 an optical pickup, 28 an RF amplifier, 29 an LPF (low pass filter), 30 an A/D converter, 31 a decoder, and 32 a microprocessor.

In FIG. 9, a reference character 33 designates a reproduction signal (a series of recorded codes), $34_U$ an upper envelope, $34_L$ a lower envelope and 35 an information signal.

In FIG. 10, a reference character 34 designates a detected signal having passed the LPF 29.

In FIGS. 7 and 8, an arrow represents a flow direction of the signals.

First of all, a description is given of the recording device (recording master cutting machine) 20 of the first embodiment of the present invention.

Referring to FIG. 7, sound signals are converted into a predetermined digital data by an A/D converter (not shown) and the digital data are inputted to the encoder 21. These digital data are converted into a waveform string on the basis of predetermined conversion rules by the encoder 21. Further, this waveform string is converted into a waveform string inherently converted by a key information or a protect code by the encoder 21 and it is outputted as another waveform string. This waveform string is inputted to the first photomodulator 22a of the photomodulator 22.

On the other hand, the key information is inputted to the FG (frequency generator) 23. The FG 23 generates a signal of a single low frequency corresponding to the key information. The signal low frequency signal is inputted to the second photomodulator 22b of the photomodulator 22.

The laser beam 24a is constantly emitted onto the photomodulator 22 by the laser 24. At first, when the laser beam 24a passes through the first photomodulator 22a, the laser beam oscillator is modulated according to the waveform string supplied thereto, so that it becomes the laser beam 24b carrying a waveform string, a light intensity of the laser beam 24b is modulated in time domain. Next, the laser beam 24b is inputted to the second photomodulator 22b. When the laser beam 24b passes through the second photomodulator 22b, the laser beam is further modulated with the single frequency signal supplied from the FG 23, so that it is converted to the laser beam 24c carrying of the series of recording codes, of which waveform has a similar figure to the series of recording code 33 shown in FIG. 9.

The photo-resist 5 on the recording master disc 4 is exposed to the laser beam 24c carrying the series of recording codes, and the exposed portions to become information pits corresponding to the series of recording codes 33 are formed thereon as concentric of spiral track turns. Thus, an information pit pattern is formed on the photo-resist 5 by causing the exposed portions to be developed.

From the recording master disc 4 provided with the photo-resist 5 having the information pit pattern, a stamper (not shown) is produced through predetermined production processes. The replica of the information pit pattern is formed on a polycarbonate substrate by injection-molding of polycarbonate resin using the stamper as a metal mold. Thus, the CD 26 is obtained by applying a predetermined processing to the polycarbonate substrate.

Next, a description is given of a shape of the information pit.

In FIG. 5, as examples of information pit rows, the first, second and third information pit rows 1, 2 and 3 are shown. Each of the information pit rows 1, 2 and 3 is disposed along a spiral track with a fixed pitch "Q". A width of each of the information pits 1A, 1B and 1C . . . , which forms the information pit row, changes symmetrically with respect to a center line of each of the information pit rows 1, 2 and 3, and also changes periodically along a circumferential line (in a form of concentric or spiral track form) of the pit row. A maximum width of the information pits 1A, 1B and 1C . . . is controlled to be less than the pitch of the track turns. Each of lengths $L_1$, $L_{1B}$, $L_{1C}$ . . . of the information pits 1A, 1B, 1C . . . is determined by a high intensity time of the laser beam 24c carrying the series of recording codes, and each of the intervals $P_{1AB}$, $P_{1BC}$ . . . thereof is determined by an OFF time (below the provided threshold level) of the laser beam 24c.

A width of each of the information pits is determined by a light intensity distribution of the laser beam 24c carrying the series of recording codes for irradiating the photo-resist 5 on the recording master 4.

Referring to FIG. 7, the laser beam 24a continuously emitted from the laser 24 is modulated in 22a with the waveform string supplied thereto as a first modulation signal, resulting the laser beam 24b outputted from the first modulator 22a. The laser beam 24b is further modulated in the second modulator 22b with the single frequency signal supplied thereto as a second modulation signal, resulting the laser beam 24c outputted from the second modulator 22b. Intensity of the laser beam 24c changes as modulated according to the waveform string derived from the information signal. However, when the laser's high intensity periods are contemplated, an instantaneous laser power varies in response to a frequency of the single low frequency signal, that is, the light intensity distributions $7_M$, $7_N$ . . . of the laser beam 24c carrying the series of recording codes is subject to change in response to a frequency of the single low frequency signal, as the frequency of the single low frequency signal is much lower than the frequency of the waveform signal. When such a signal as recorded is detected in reproduction, a waveform of reproduction signal 33 is observed as shown in FIG. 9, which indicates that the intensity of the laser beam 24c is modulated largely by the low single frequency signal generated by the FG 23, and is superposed (as an additional modulation) with the information signal 34, an amplitude of which is defined by an upper envelope $34_U$ and a lower envelope $34_L$.

Next, referring to FIG. 6, a description is given of relations between the light intensity distributions of the laser beam 24c and the widths of the information pits.

The cross sections along line M–M' and N–N' in FIG. 5 are shown in FIG. 6(b) as both the pit portions $6_M$ and the pit portion $6_N$ which are formed on the photo-resist 5 of the recording master 4.

FIG. 6(a) represents the light intensity distributions of the laser beam 24c of the series of recording codes, wherein an ordinate represents light intensity I and an abscissa represents positions in the radial direction of the recording master.

In FIG. 6(a), there are shown the light intensity distribution $7_M$ for forming the pit portion $6_M$ having a cross section along the line M–M' and the light intensity distribution $7_N$ for forming the pit portion $6_N$ having a cross section along the line N–N', respectively.

As seen from FIG. 6(a), in the case of forming the information pit portion $7_M$ along the line M–M', the width of the laser beam 24c having the light intensity more than a threshold value for irradiating the photo-resist 5 is "$W_M$", thus the information pit portion $7_M$ has a width of "$W_M$", similarly, in the case of forming the information pit portion $7_N$ having along the line N–N', the width of the laser beam 24c is "$W_N$", thus, the information pit portion $7_N$ has a width of "$W_N$".

Accordingly, along the circumferentially extended information pit rows, the widths of exposed portions of the photo-resist 5, which correspondingly become the information pits, changes to form the outer contour $8_o$ and the inner contour $8_I$. These outer and inner contours $8_o$, $8_I$ are symmetrical to each other with respect to a center line of the information pit row 1 and the configurations of the outer and inner contours $8_o$, $8_I$ are similar to those of the envelopes $34_U$, $34_L$ shown in FIG. 9.

Next, a description is given of an outline of the reproducing device 25.

As shown in FIG. 8, the laser beam is constantly irradiated on the information pit rows on the CD 26 from a laser element which is one of the components of the optical pickup 27. Reproduction signal is obtained by the optical pickup 27 by detecting intensity changes of reflected light of the laser beam corresponding to the shapes and intervals of the information pits.

The reproduction signal is inputted to the RF amplifier 28. After amplified, the reproduction signal is outputted as a waveform string and is inputted to the decoder 31 after having subjected to a waveform equalization and a discriminating process (not shown), wherein the waveform string has waveforms of the information signal 35 having the envelopes $34_U$, $34_L$ shown in FIG. 9 corresponding to the changes of width of the information pits.

The same waveform string is also inputted to the LPF 29 where the information signal is removed. In FIG. 10, there is shown the detected signal 34 having passed through the LPF 29, which is the same waveform as that of the signal of the single frequency signal used for the modulation to produce the aforementioned series of recording codes. The detected signal 34 having passed through the LPF is taken out as the key information formerly used in the recording process, by the A/D converter 30, and is inputted to the microprocessor 32 for controlling the reproducing device 25.

The waveform string is decoded by causing the microprocessor 32 to verify the contents of the key information and to control the decoder 31 to perform an inverse conversion of the encoding which was performed in the recording. Thus, the digital data are obtained, which are converted to the sound signal or the original data by a D/A converter (not shown).

As seen from the above description, when the information pit row has no change in the width direction, the wave string is not detected because of the absence of the key information, thus, the data can not be reproduced.

Further, in the case where the information pits are reproduced by using a conventional CD reproducing device, the reproduction signal may be obtained, but the sound signal can not be obtained because of the absence of the key information.

(A second embodiment of the present invention)

Figure 13:
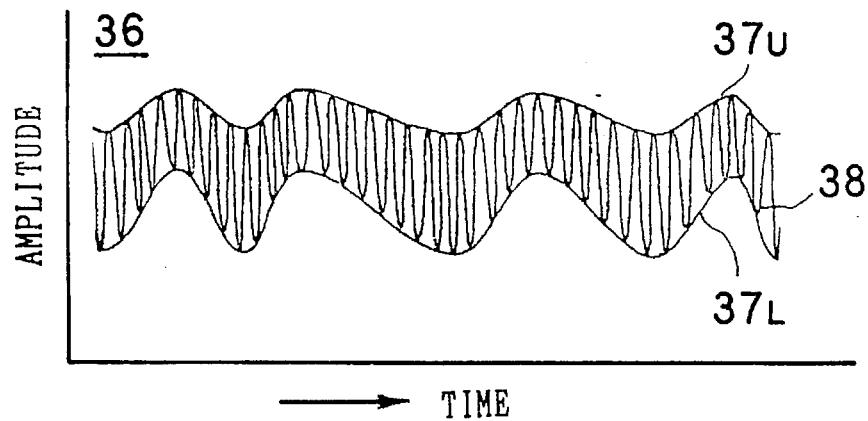
FIG. 13 shows a reproduction signal (recording code string) in the information reproducing apparatus of the second embodiment in the present invention.
Figure 14:
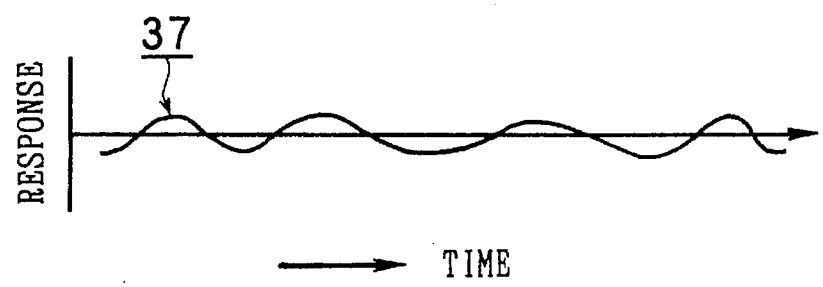
FIG. 14 shows detected signals having passed an LPF in the information reproducing apparatus of the second embodiment in the present invention.
Figure 11:
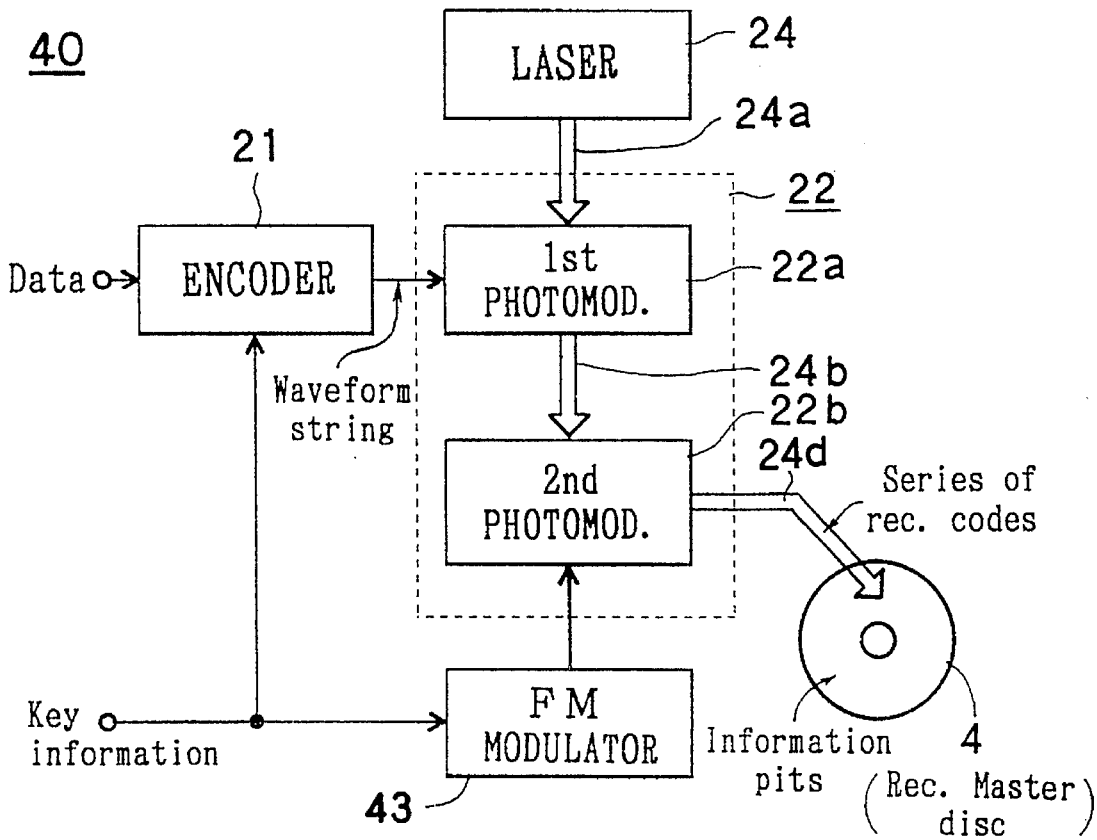
FIG. 11 is a block diagram showing flows of recording signals in a recording device of a second embodiment in the present invention.
Figure 12:
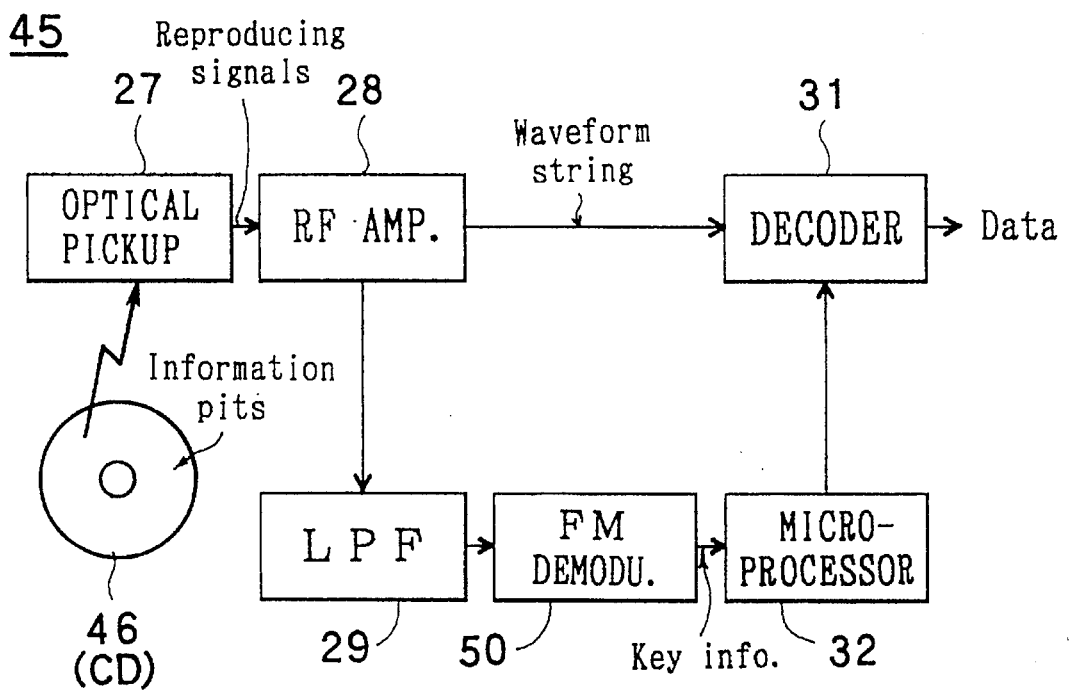
FIG. 12 is a block diagram showing flows of reproduction signals in a reproducing device of the second embodiment in the present invention.

FIG. 11 is a block diagram showing flows of recording signals in a recording device of a second embodiment in the present invention;

FIG. 12 is a block diagram showing flows of reproduction signals in a reproducing device of the second embodiment in the present invention;

FIG. 13 shows reproduction signal (a series of recording codes) in the information reproducing apparatus of the second embodiment in the present invention; and FIG. 14 shows a detected signal having passed an LPF in the information reproducing apparatus of the second embodiment in the present invention.

Referring now to the above drawings, wherein like reference characters designate corresponding parts throughout several views.

In FIG. 11, a reference character 40 designates a recording device and 43 an FM modulator.

In FIG. 12, a reference character 45 designates reproducing device, 46 a CD, and 50 an FM demodulator.

At the beginning, a description is given of a recording device (recording master cutting machine) 40 of the second embodiment of the recording apparatus according to the present invention.

In FIG. 13, a reference character 36 designates a reproduction signal ( a series of recording codes), $37_U$ an upper envelope, $37_L$, a lower envelope and 38 information signals.

In FIG. 14, a reference character 37 designates a detected signal having passed through the LPF.

As shown in FIG. 11, sound signals are converted into predetermined digital data by an A/D converter (not shown) and the digital data are inputted to the encoder 21. These digital data are converted into a waveform string on the basis of predetermined conversion rules by the encoder 21. Further, this waveform string is converted into a waveform string inherently converted by a key information or a protect code in the encoder 21 and is outputted as another waveform string. This waveform string is inputted to the first photomodulator 22a of the photomodulator 22.

On the other hand, the key information is inputted to the FM modulator 43. The FM modulator 43 generates an FM signal corresponding to the key information. The FM signal is inputted to the second photomodulator 22b of the photomodulator 22.

The laser beam 24a is constantly emitted onto the photomodulator 22 from the laser beam oscillator 24. At first, when the laser beam 24a passes through the first photomodulator 22a, the laser beam 24a is modulated according to the waveform string, so that it becomes the laser beam 24b carrying a waveform string, a light intensity of the laser beam 24a is modulated in time domain. Next, when the laser beam 24b passes through the second photomodulator 22b, the laser beam is further modulated with the FM signal supplied from the FM modulator 43, so that it is converted to the laser beam 24d carrying the series of recording codes, of which waveform has a similar figure to the series of recording code 36 shown in FIG. 13.

The photo-resist 5 on the recording master disc 4 is exposed to the laser beam 24d carrying the series of recording codes, and exposed portions to become information pits which correspond to the series of recording codes 36 are formed thereon. Thus, an information pit pattern is formed on the photo-resist 5 by causing the photo-resist 5 to be developed.

From the recording master disc 4 provided with the photo-resist 5 having the information pit pattern, a stamper (not shown) is formed through predetermined production processes. The replica of the information pit pattern is formed on a polycarbonate substrate by injection-molding of polycarbonate resin using the stamper as a metal mold. Thus, the CD 46 is obtained after the polycarbonate substrate undergoes predetermined processes. The shape of the information pit is similar to that of the aforementioned first embodiment. The different point is that shapes of the inner and outer contours $8_I$, $8_o$ of the information row 1 shown in FIG. 5 are only replaced with the envelopes $37_U$, $37_L$ which are modulated in FM in place of the single low frequency amplitude modulation. Thus, FM envelope-modulated information signal 38 shown in FIG. 13. Thus, detailed description is omitted.

In summary, along the circumferentially extended information pit rows a width of each of the information pits, of which the information pit rows are composed, changed periodically (FM) and symmetrically with respective to a center line of each of the information pit rows.

As to the shape of information pits, each of lengths of the information pits is determined by high intensity time of the laser beam 24d carrying the series of recording codes and each of the intervals between the information pits is determined by an OFF time (below the provided threshold level) of the laser beam 24d.

A width of each of the information pits is determined by the light intensity distribution of the laser beam 24d carrying the series of recording codes for irradiating the photo-resist 5 on the recording master disc 4.

Referring to FIG. 11, the laser beam 24a continuously emitted from the laser beam oscillator 24 is modulated in the first photomodulator 22a with the waveform string supplied thereto as a first modulation signal, resulting the laser beam 24b outputted from the first photomodulator 22a. The laser beam 24b is further modulated in the second photomodulator 22b with the FM signal supplied thereto from the FM modulator 43 as a second modulation signal, resulting the laser beam 24d outputted from the second photomodulator 22b. Intensity of the laser beam 24d changes as modulated according to the waveform string derived from the information signal. However, when the laser's high intensity periods are contemplated, an instantaneous laser power is subjected to an instantaneous frequency of the FM signal, that is, the light intensity distributions of the laser beam 24d carrying the series of recording codes is subject to change in response to the instantaneous frequency of the FM signal, as the frequency of the FM signal is much lower than the frequency of the waveform signal. When such a signal as recorded is detected in reproduction, a waveform of reproduction signal 36 is observed as shown in FIG. 13, which indicates that the intensity of the laser beam 24d is modulated largely by the low frequency FM signal generated by the FM modulator 43, and is superposed (as an additional modulation) with the information signal 38, an amplitude of which is defined by an upper envelope $37_U$ and a lower envelope $37_L$, further, both the envelopes $37_U$, $37_L$ are FM modulation.

In other words, the width of each of the information pits is changed according to the light intensity distribution of the laser beam.

Next, a description is given of an outline of the reproducing device 45.

As shown in FIG. 12, the laser beam is constantly irradiated on the information pit rows of the CD 46 by a laser element which is one of the components of the optical pickup 27. Reproduction signal is obtained by the optical pickup 27 by detecting intensity change of reflection light of the laser beam corresponding to the shapes of the information bits.

The reproduction signal is inputted to the RF amplifier 28. After amplified, the reproduction signal is outputted as a waveform string and is inputted to the decoder 31 after undergoing a waveform equalization and a discriminating process (not shown), wherein the waveform string has waveforms of the information signal 38 having the envelopes $37_U$, $37_L$ shown in FIG. 13 corresponding to the change of the width of the above information pit row.

The waveform string is also inputted to the LPF 29 where the information signal 38 is removed. In FIG. 14, there is shown the detected signal 37 having passed through the LPF 29, which is the same waveform as that of the FM modulation signal having the predetermined carrier frequency used for the modulation to produce the aforementioned series of recording codes. The detected signals 37 having passed through the LPF are taken out as the key information by the FM demodulator 50 as the key information formerly used in the recording process, and is inputted to the microprocessor 32.

The waveform string is decoded by causing the microprocessor 32 to verify contents of the key information and to control the decoder 31 to perform an inverse conversion of the encoding performed in the recording. Thus, the digital data are obtained, which are converted to sound signal by a D/A converter (not shown).

As seen from the above description, when the information pit row has no change of the width thereof, the waveform string is not decoded because of an absence of the key information, thus the data can not be reproduced.

Further, in the case where the information pits are reproduced by using a conventional CD reproducing device, the reproduction signals may be obtained, but the sound signals can not be obtained because of the absence of the key information.

(A third embodiment of the present invention)

Figure 15:
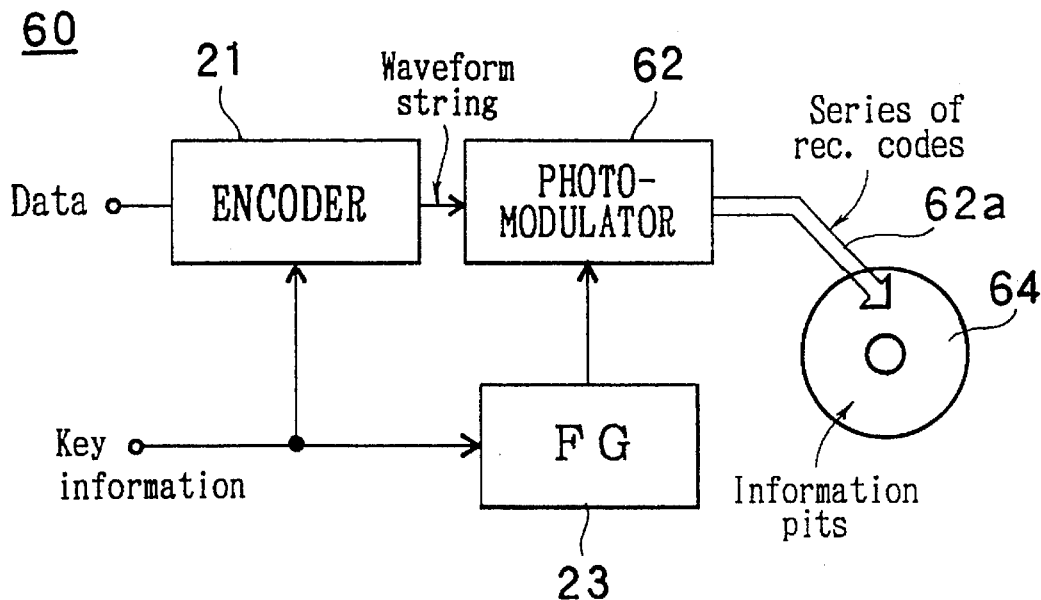
FIG. 15 is a block diagram showing flows of recording signals a recording device of a third embodiment in the present invention.

FIG. 15 is a block diagram showing flows of recording signals in a recording device of a third embodiment in the present invention;

Referring to FIG. 15, wherein like reference characters designate corresponding parts. A reference character 60 designates a recording device, 62 a photomodulator including a semiconductor laser, 62a a laser beam carrying a series of recording codes, and 64 a rewritable optical disc.

For instance, a sound signal is converted into predetermined digital data by an A/D converter (not shown) and the digital data are inputted to the encoder 21. These digital data are converted into a waveform string on the basis of predetermined conversion rules by the encoder 21. Further, this waveform string is converted into a waveform string inherently converted by a key information or a protect code separately inputted to the encoder 21, and the converted waveform string is outputted therefrom. This waveform string is inputted to the photomodulator 62.

On the other hand, the key information is also inputted to the FG (frequency generator) 23. The FG 23 generates a signal of single frequency according to the key information. The single frequency signal is inputted to the photomodulator modulator 62.

In the photomodulator 62, the inputted waveform string and the inputted signal frequency signal are mixed and modulated a driving current of the semiconductor laser incorporated in the photomodulator 62 to produce a laser beam 62a intensity modulated accordingly. As predetermined portions of the rewritable optical disc 64 are irradiated by thus modulated laser beam 62a, the series of recording codes 33 containing the information signal 35 having upper and lower envelopes 34U and 35L as shown in FIG. 9, is recorded in the rewritable optical disc 64.

The shape of the information pit is similar to that of the first embodiment, thus the description is omitted.

The reproduction of the information signals or the sound signal are performed by using the reproducing device 25 and the same result can be obtained.

(A fourth embodiment of the present invention)

Figure 16:
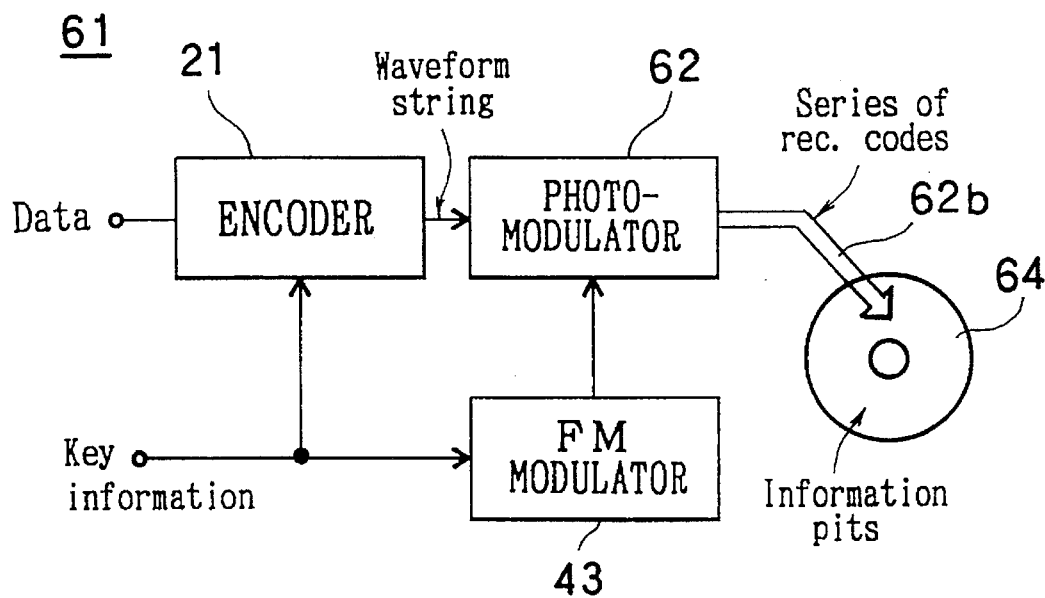
FIG. 16 is a block diagram showing flows of recording signals in a recording device of a fourth embodiment in the present invention.

FIG. 16 is a block diagram showing flows of recording signals in a recording device of a fourth embodiment in the present invention;

Referring now to FIG. 16, wherein like reference characters designate corresponding parts. A reference character 61 designates a recording device, and 62b a laser beam carrying a series of recording codes.

For instance, a sound signal is converted into predetermined digital data by an A/D converter (not shown) and the digital data are inputted to the encoder 21. These digital data are converted into a waveform string on the basis of predetermined conversion rules by the encoder 21. Further, this waveform string is converted into a waveform string inherently converted by a key information or a protect code separately inputted to the encoder 21 and the converted waveform string is outputted therefrom. This waveform string is inputted to the photomodulator 62.

On the other hand, the key information is also inputted to the FM modulator 43. The FM modulator 43 generates the FM signals having a predetermined carrier frequency corresponding to the key information. The FM signal is inputted to the photomodulator 62.

In the photomodulator 62, the inputted waveform string and the inputted FM signal are mixed and modulate a driving current of the semiconductor laser incorporated in the photomodulator 62 to produce a laser beam 62b intensity modulated accordingly. As predetermined portion of the rewritable optical disc 64 are irradiated by thus modulated laser beam 62a, the series of recording codes 36 containing the information signal 38 having upper and lower envelopes $37_U$ and $37_L$ as shown in FIG. 13, is recorded on the rewritable optical disc 64.

The shape of the information pit is similar to that of the second embodiment, thus the description is omitted.

The reproduction of the information signals or the sound signal are performed by using the reproducing device 45 and the same result as that of the second embodiment can be obtained.

According to the optical disc of the present invention, digital data to be recorded in a form of concentric or spiral track turns having a predetermined pitch, are converted to a waveform string according to a predetermined encoding scheme defined by a key information, and a single frequency or FM modulated carrier signal is derived from the key information, then the waveform string carrying the digital data and the carrier signal are recorded optically on the optical disc as a series of pits forming the track turns with such a pit configuration that a width of the series of pits in a radial direction of the optical disc is deviated symmetrically with respect to a center of each track turn by being modulated by the single frequency or FM modulated carrier signal, where the maximum deviation is smaller than the predetermined pitch, so that the digital data are prevented from reading out without having the key information for a purpose of illegal copy protection.

According to the information recording apparatus of the present invention using the above optical disc, the apparatus is composed of a converting device for converting digital data into a waveform string carrying the digital data according to a key information, a carrier generating device for generating a carrier derived from the key information, and a modulating device for modulating a light beam with the waveform string carrying the digital data and the carrier in a form of recording code series, of which both envelopes are modulated by the carrier, and optically recording the recording code series on the disc as a series of pits on the disc.

According to the information reproducing apparatus of the present invention using the above optical disc, the apparatus is composed of a first detecting device for optically detecting a series of pits on the disc and reproducing from the detected series of pits, a carrier and a waveform string carrying digital data, a second detecting device for recovering a key information from the reproduced carrier, and a deconversion device for recovering the digital data from the waveform string by using the key information recovered by the second detecting device.

Accordingly, in the case where the information pits are reproduced by using a conventional reproducing device which lacks capability of reading a protect code, i.e., the key information contained in the recording signal, illegal copying is prevented.

As an example, the information (protect code) referred to in this specification may be a frequency of the carrier in the case of single frequency carrier, or a modulation frequency of the FM signal, however, a more sophisticated code modulated in the FM signal is also conceivable.

What is claimed is:

1. A copy protecting optical disc optically recorded with digital data and a key information as a series of pits forming track turns of a predetermined pitch on the optical disc, the digital data being converted to a string of signal waveforms according to a predetermined encoding scheme defined by the key information, the key information being a form of carrier signal which has a single frequency signal that is much lower in frequency than a frequency of the string of signal waveforms, the single frequency signal modulating the string of signal waveform carrying the digital data in such a pit configuration that each of a plurality of widths of the series of pits in a radial direction of the optical disc is deviated symmetrically with respect to a center of each track turn, and an outer contour and an inner contour of each of the plurality of widths in the radial direction are changed in response to an amplitude of the single frequency signal of the key information, each of the plurality of widths of the series of pits having a maximum width smaller than the predetermined pitch.

2. A copy protecting optical disc optically recorded with digital data and a key information as a series of pits forming track turns of a predetermined pitch on the optical disc, the digital data being converted to a string of signal waveforms according to a predetermined encoding scheme defined by the key information, the key information being a form of carrier signal which is an FM frequency signal that is much lower in frequency than a frequency of the string of signal waveforms, the FM frequency signal of the key information modulating the string of signal waveforms carrying the digital data in such a pit configuration that each of a plurality of widths of the series of pits in a radial direction of the optical disc is deviated symmetrically with respect to a center of each track turn, and an outer contour and an inner contour of each of the plurality of widths of the series of pits are changed in response to an amplitude of the FM frequency of the key information, each of the plurality of widths of the series of pits having a maximum width smaller than the predetermined pitch.

* * * * *